June 11, 1940.  C. E. PEARSON  2,203,797

STORAGE BATTERY

Filed Dec. 7, 1937

INVENTOR.
CARL E. PEARSON
BY Kwis Hudson & Kent
ATTORNEYS

Patented June 11, 1940

2,203,797

UNITED STATES PATENT OFFICE 2,203,797

STORAGE BATTERY

Carl E. Pearson, Cleveland Heights, Ohio, assignor to Willard Storage Battery Company, Cleveland, Ohio, a corporation of West Virginia Application December 7, 1937, Serial No. 178,554

2 Claims. (Cl. 136—178)

This invention relates to storage batteries and has particular reference to improvements in the venting means for the various battery cells.

As is well known, each cell of a battery is provided with a hollow vent plug which is screwed into the cover and is provided with an opening through which the evolved gases are vented from the cell. As is also well known, the vent plug is removed when it is desired to add water or electrolyte to the battery. Although the vent opening in the vent plug is of relatively small size, it has been found that when the battery is used on machines employed in dusty regions, such as on farm tractors, the top of the battery becomes covered with dust and that considerable dust seeps through the vent openings into the cells. It has also been discovered that if batteries are submerged in water the battery will become filled with water which is often muddy particularly if the batteries are submerged under flood waters. In both cases mud collects in the bottom of the cells, with the result that the efficiency of the battery is greatly decreased and sometimes the battery is destroyed by short-circuiting of the plates. In any event, the covers must be removed and the mud and silt taken from the cells and the battery filled with fresh electrolyte.

The above disadvantages are overcome very effectively by the present invention which comprises the application to the vent plugs of tubes of rubber or equivalent yieldable material which are so formed as to permit the escape of gas from the cells but preclude the entrance of water, mud, dust, and the like, and which, though flexible, are of sufficient inherent strength to resist without collapsing the pressure incident to immersion under several feet of water.

The invention may be further briefly summarized as consisting in certain novel details of construction and combinations and arrangements of parts which will be described in the specification and set forth in the appended claims.

In the accompanying sheet of drawings.

Figure 1:
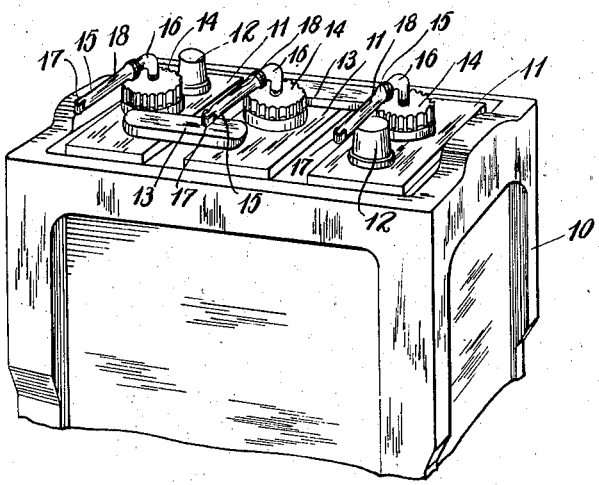
Fig. 1 is a perspective view of the upper part of a battery equipped with one embodiment of my invention.

Referring now to the drawing, 10 represents a battery which may have any number of cells, a three-cell battery being here shown, the covers of the cells being indicated at 11. Extending through the covers are the usual terminal posts 12 and the posts which are connected by cross-connectors or intercell connectors 13. Likewise, each cover is provided with a hollow vent plug 14 which, as is customary, is adapted to be screwed into a flanged opening of the cover. All the parts so far described may be of usual or standard construction aside from the modification required in the vent plugs to receive the tubular extensions to be described.

In carrying out the present invention, each cell is provided with a special or improved one-way valve which permits the escape of gas but precludes the entrance of air, water, dust, mud and the like. These one-way valves are preferably in the form of flexible tubes of rubber or equivalent material which communicate with the interior of the cells, their outer ends being closed and between their ends being provided with one-way valve openings, preferably slits, which are normally closed but which will open to permit the escape of gas and are substantially sealed against the entrance of air, water, dust, and the like. Preferably these tubes communicate with the cells through the vent plugs to which they are suitably attached. In some instances, the tubes may extend horizontally over the cells and in other instances they may project vertically from the vent plugs. The former arrangement is preferably used if the batteries are employed in areas or with equipment such as buoys where the battery is likely to be submerged in water or where there is only limited space above the battery. The upright tubes may be employed to advantage if the battery is to be used in areas where thick layers of dust may accumulate on the battery, in which case the tubes prevent the plugging of the vent openings and the consequent rise of pressure in the cells.

Figure 2:
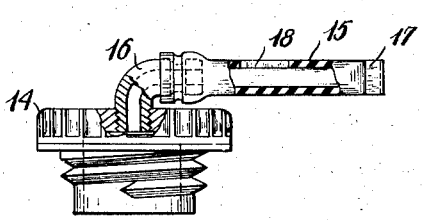
Fig. 2 is a detached view of one of the vent plugs with a tube connected therewith in the manner illustrated in Fig. 1, parts being in section.
Figure 3:
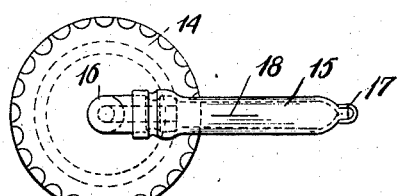
Fig. 3 is a plan view of the same.

In Figs. 1, 2, and 3, wherein the horizontal arrangement of the tubes is shown, the tubes, which are illustrated at 15, are tightly fitted onto the ends of L-shaped nipples 16 which are preferably screwed into threaded openings each disposed centrally of the top of the vent plug where the vent opening is generally provided, in which case the usual vent opening is enlarged and its inner wall threaded to accommodate the nipple. The outer or free end of the nipple is grooved to provide tight engagement with the tube which is fitted thereover and may also be cemented in place. The outer or free end of each tube is closed by being cemented shut and may be further held closed by a metal clamp 17. The body of the tube is provided between the clamp 17 and the nipple 16 with a normally closed slit 18 which serves the purpose previously mentioned of allowing the egress of gas but preventing the entrance of water, dust, and the like. Although, with a one-way valve in the form of a slit tube, the tube must be flexible, nevertheless tubes are selected which have sufficient inherent strength to resist collapsing under predetermined pressure, such as pressure incident to immersion under water of predetermined depth generally several feet.

Figure 5:
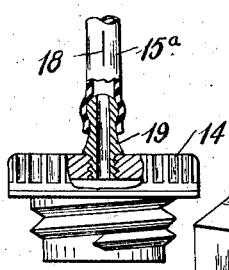
Figs. 5 and 6 are views similar to Fig. 2 showing modifications in the means for attaching the tubes to the vent plugs.
Figure 4:
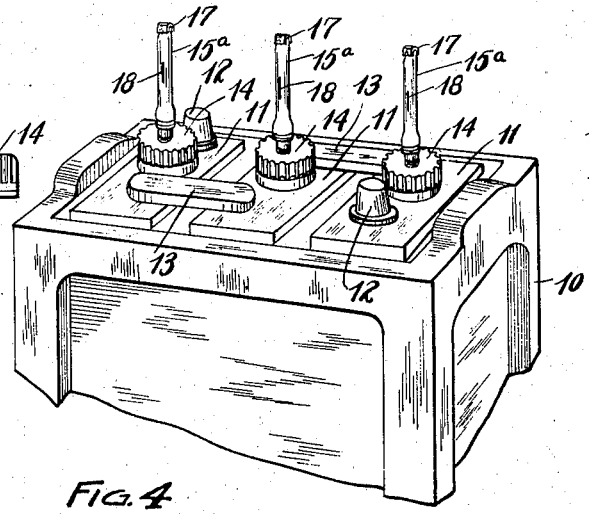
Fig. 4 is a view similar to Fig. 1 showing another embodiment of the invention.
Figure 6:
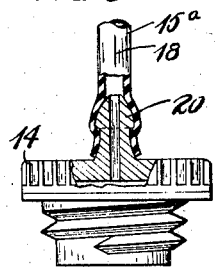

In Figs. 4, 5, and 6, upright tubes, here designated 15a, are employed. These tubes are each provided between their ends with a slit 18, and each has its outer end closed in the manner previously described. These tubes may be connected to the vent plugs by nipples or hollow stems or the equivalent constituting extensions of the top of the plugs. For example, in Fig. 5 the lower end of the tube is fitted onto the round or enlarged upper end of a hollow stem 19 which is screwed into the top of the vent plug 14. In Fig. 6 the tube is tightly fitted onto the enlarged end of a hollow stem 20 formed integral with the top of the vent plug. Other ways of attaching the tubes to the vent plugs may be employed, but the means illustrated have proved in practice to be very effective and add little to the cost of the vent plugs.

While I have shown several embodiments of the invention, I do not desire to be confined to the precise details shown but aim in my claims to cover all modifications which do not involve a departure from the spirit and scope of the invention.

Having thus described my invention, I claim:

1. A storage battery having a removable vent plug and filler cap for venting and filling purposes, said plug having a nipple of a diameter smaller than that of the plug extending from its upper surface, and a flexible tube mounted at one end on said nipple, said tube having a diameter which is a small fraction of its length and being free at its outer end and closed except for a slit in its side, and said tube communicating with the interior of the battery through said nipple, whereby the plug may be removed for testing the electrolyte or adding liquid thereto without disturbing the mounting of the tube thereon.

2. A storage battery having a removable vent plug and filler cap for venting and filling purposes, said plug having a hollow body with an externally threaded shank adapted to fit a threaded opening in a cell cover of the battery, and having a head of a diameter larger than the shank providing a hand-hold lying above the cell cover in the operative position of the plug, a nipple extending upwardly from the head at the center of the plug and communicating with the space surrounded by said hollow body, the diameter of the nipple being a small fraction of that of the head, and a flexible tube mounted on said nipple, said tube extending upwardly from the nipple and being closed except for a slit which is normally closed but opens to permit egress of gas.

CARL E. PEARSON.